US012579402B2

(12) United States Patent (10) Patent No.: US 12,579,402 B2
Jeong et al. (45) Date of Patent: Mar. 17, 2026

(54) METAL IC CARD WITH IMPROVED ANTENNA CHARACTERISTICS AND MANUFACTURING METHOD FOR METAL IC CARD

(71) Applicant: KONA M CO., LTD., Jincheon-gun (KR)

(72) Inventors: Young Hoon Jeong, Seosan-si (KR); Ki Sung Nam, Jincheon-gun (KR); Dong Gu Kim, Ansan-si (KR)

(73) Assignee: KONA M CO., LTD., Jincheon-gun (KR)

( * ) Notice: Subject to any disclaimer, the term of this patent is extended or adjusted under 35 U.S.C. 154(b) by 70 days.

(21) Appl. No.: 18/701,897

(22) PCT Filed: Nov. 22, 2022

(86) PCT No.: PCT/KR2022/018472
§ 371 (c)(1),
(2) Date: Apr. 16, 2024

(87) PCT Pub. No.: WO2023/090975
PCT Pub. Date: May 25, 2023

(65) Prior Publication Data
US 2025/0225361 A1 Jul. 10, 2025

(30) Foreign Application Priority Data
Nov. 22, 2021 (KR) ........................ 10-2021-0160987

(51) Int. Cl.
*G06K 19/077* (2006.01)

(52) U.S. Cl.
CPC . *G06K 19/07773* (2013.01); *G06K 19/07745* (2013.01); *G06K 19/0775* (2013.01)

(58) Field of Classification Search
CPC ....... G06K 19/07773; G06K 19/07745; G06K 19/0775
(Continued)

(56) References Cited

U.S. PATENT DOCUMENTS 11,232,341 B2 * 1/2022 Lowe ..................... B42D 25/00
12,159,180 B1 * 12/2024 Finn ................... G06K 19/0723
(Continued)

FOREIGN PATENT DOCUMENTS

KR 10-2017-0120524 A 10/2017
KR 10-2018-0020097 A 2/2018
(Continued)

OTHER PUBLICATIONS

International Search Report & Written Opinion for PCT/KR2022/018472 by Korean Intellectual Property Office dated Mar. 6, 2023.
(Continued)

*Primary Examiner* — Allyson N Trail
(74) *Attorney, Agent, or Firm* — BROADVIEW IP LAW, PC

(57) ABSTRACT

Proposed is a wireless IC card having a wireless IC chip and a metal body. The wireless IC card includes an IC chip accommodating portion having an opening and being provided to accommodate the IC chip, a slit portion formed from a first side of the accommodating portion toward an outer edge of the metal body, and an antenna formed on a lower surface of the metal body and electrically connected to the IC chip. At least one antenna pattern is wound around the accommodating portion, and a first end of a first pattern is electrically connected to a first bonding position adjacent to the slit portion, so that one antenna pattern extends in a direction continuous with a winding direction of the antenna. The first bonding position is a preset position
(Continued)

configured such that at least a portion of the metal body constitutes turns of the first pattern.

10 Claims, 5 Drawing Sheets

(58) Field of Classification Search
USPC ........................................................ 235/492
See application file for complete search history.

(56) References Cited

U.S. PATENT DOCUMENTS

2009/0201116 A1* 8/2009 Orihara ..................... H01Q 1/38
336/200
2014/0104133 A1* 4/2014 Finn ................. G06K 19/07769
343/866
2017/0026089 A1* 1/2017 Kato ................ G06K 19/07722

FOREIGN PATENT DOCUMENTS

| KR | 10-2019-0137824 A | 12/2019 |
| KR | 10-2021-0050644 A | 5/2021 |
| KR | 10-2021-0115653 A | 9/2021 |
| WO | 2015/182638 A1 | 12/2015 |

OTHER PUBLICATIONS

Office Action for KR 10-2021-0160987 by Korean Intellectual Property Office dated Feb. 22, 2024.
Office Action for JP 2024-522553 by Japan Patent Office dated Apr. 15, 2025.

* cited by examiner

FIG. 7

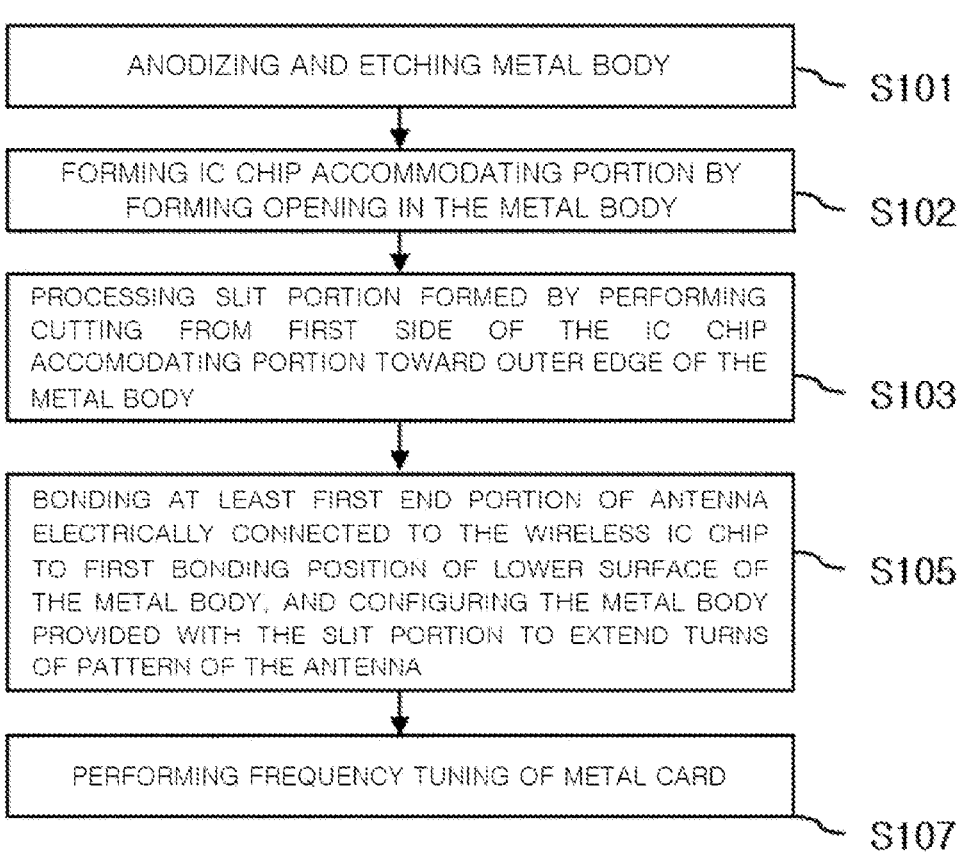

```
┌─────────────────────────────────────────────┐
│      ANODIZING AND ETCHING METAL BODY        │ ～ S101
└─────────────────────────────────────────────┘
                        ↓
┌─────────────────────────────────────────────┐
│   FORMING IC CHIP ACCOMMODATING PORTION BY   │ ～ S102
│     FORMING OPENING IN THE METAL BODY        │
└─────────────────────────────────────────────┘
                        ↓
┌─────────────────────────────────────────────┐
│ PROCESSING SLIT PORTION FORMED BY PERFORMING │
│ CUTTING FROM FIRST SIDE OF THE IC CHIP       │ ～ S103
│ ACCOMODATING PORTION TOWARD OUTER EDGE OF THE│
│ METAL BODY                                   │
└─────────────────────────────────────────────┘
                        ↓
┌─────────────────────────────────────────────┐
│ BONDING AT LEAST FIRST END PORTION OF ANTENNA│
│ ELECTRICALLY CONNECTED TO THE WIRELESS IC CHIP│
│ TO FIRST BONDING POSITION OF LOWER SURFACE OF│ ～ S105
│ THE METAL BODY, AND CONFIGURING THE METAL BODY│
│ PROVIDED WITH THE SLIT PORTION TO EXTEND TURNS│
│ OF PATTERN OF THE ANTENNA                    │
└─────────────────────────────────────────────┘
                        ↓
┌─────────────────────────────────────────────┐
│   PERFORMING FREQUENCY TUNING OF METAL CARD  │ ～ S107
└─────────────────────────────────────────────┘
```

METAL IC CARD WITH IMPROVED ANTENNA CHARACTERISTICS AND MANUFACTURING METHOD FOR METAL IC CARD

CROSS-REFERENCE TO RELATED APPLICATIONS

This application is a National Phase Entry Application of PCT Application No. PCT/KR2022/018472, filed on Nov. 22, 2022, which claims priority to Korean Patent Application No. 10-2021-0160987, filed on Nov. 22, 2021, in the Korean Intellectual Property Office, the entire contents of which are hereby incorporated by reference in its entirety.

TECHNICAL FIELD

The present disclosure relates to a metal card and a manufacturing method for the metal card. More particularly, the present disclosure relates to a metal IC card with improved antenna characteristics, and relates to a manufacturing method for the metal IC card.

BACKGROUND ART

Generally, credit cards may be used in place of cash, and are developed recently as smart cards embedded with IC chips that can store large amounts of information so as to be actively used as various membership cards, as well as for payment.

Special cards using various materials have been developed in the market of smart cards. In particular, credit cards having differentiated metal materials have been developed for VIP customers, and the metal cards that realize high-dignity credit cards with metallic luster have been provided to special customers.

However, due to the characteristics of metal, an antenna in a conventional metal card has difficulty in operating when the conventional metal cards are communicating with a reader in a wireless manner, so that restrictions on RF functions, using ATMs, and so on may occur. In addition, a method of manufacturing a card using a thin metal sheet or by thinly coating metal powder makes it difficult to form patterns and characters on a surface of a metal card, and when the card is formed of a material that is too light, there is also a problem in that the sense of weight that the metal has cannot be felt. Therefore, it is required to develop metal cards capable of overcoming the limitations of the metal cards and capable of expressing the feeling of weight and aesthetics peculiar to the metal.

For example, in Korean Utility Model No. 20-0382725 that is a related art, a metal thin film plastic card is provided. In the metal thin film plastic card, a thin film having a size smaller than a size of a core sheet is attached to an upper surface and a lower surface of the core sheet formed or synthetic resin so that a black space is formed on a circumference of the upper and lower surfaces of the core sheet, and an antenna coil is mounted along the circumference. However, in such related art, since metal is disposed on a portion of a center portion of a card in order to avoid contact between the antenna and the metal, there is a limitation that the overall aesthetic is deteriorated and it is difficult to express a metal texture on the entire card.

Accordingly, in order to solve this problem, a metal material card configured such that a metal sheet layer formed of an SUS material and a separated antenna layer are independently provided and the antenna layer and a contacttype IC chip are connected to each other in a wired manner or a wireless manner such that wired and wireless payment is capable of being realized attracts attention.

However, in a structure for a wireless function of the metal material card, since a blocking layer and so on are required to be formed in the middle of the structure so that a frequency signal received by an antenna coil does not interfere with or is disturbed by a metal member of the metal card, there is a disadvantage that the thickness of the metal material card is increased and antenna sensitivity is not good.

Due to such a disadvantage, current metal material cards capable of performing wireless communication have a high difficulty in performing post-processing operations such as performing frequency tuning in consideration of a blocking layer, and this causes an increase in the manufacturing cost.

DISCLOSURE

Technical Problem

Accordingly, the present disclosure has been made keeping in mind the above problems occurring in the related art, and an objective of the present disclosure is to provide a metal card and a manufacturing method for a metal card capable of providing increased antenna sensitivity and ease of performing frequency tuning, the metal card being configured such that a metal material card having a thin thickness without a separate blocking layer is provided.

Technical Solution

In order to achieve the objective of the present disclosure, according to an embodiment of the present disclosure, there is provided a wireless IC card in which a wireless IC chip is mounted and which includes a metal body, the wireless IC card including: an IC chip accommodating portion formed by forming an opening in the metal body and being provided so as to accommodate the wireless IC chip; a slit portion formed by cutting the metal body from a first side of the IC chip accommodating portion toward an outer edge of the metal body; and an antenna formed on a lower surface of the metal body and electrically connected to the wireless IC chip. The antenna is formed such that at least one antenna pattern is wound around the IC chip accommodating portion, and a first end of a first pattern is electrically connected to a first bonding position of the metal body positioned adjacent to the slit portion by a preset first distance, so that at least one antenna pattern extends in a direction continuous with a winding direction of the antenna. Furthermore, the first bonding position is a preset position configured such that at least a portion of the metal body provided with the slit portion constitutes turns of the first pattern.

In addition, in order to achieve the objective of the present disclosure, according to an embodiment of the present disclosure, there is provided a manufacturing method for a wireless IC card in which a wireless IC chip is mounted and which includes a metal body, the manufacturing method including: a process of forming an IC chip accommodating portion provided so as to accommodate the wireless IC chip by forming an opening in the metal body; a process of processing a slit portion that is formed by cutting the meal body from a first side of the IC chip accommodating portion toward an outer edge of the metal body; and a process of connecting an antenna that is electrically connected to the wireless IC chip to a lower surface of the metal body. The antenna is formed such that at least one antenna pattern is wound around the IC chip accommodating portion, and a first end of a first pattern is electrically connected to a first bonding position of the metal body positioned adjacent to the slit portion by a preset first distance, so that at least one antenna pattern extends in a direction continuous with a winding direction of the antenna. Furthermore, the first bonding position is a preset position configured such that at least a portion of the metal body provided with the slit portion constitutes turns of the first pattern.

Advantageous Effects

According to an embodiment of the present disclosure, the shape of the metal sheet of the metal material card is formed in a slit structure, and at least a portion of the antenna coil extends to an adjacent position around the slit portion, so that the metal sheet has an extended winding pattern of the antenna coil. Therefore, the metal card and the manufacturing method for the metal card being capable of providing increased antenna sensitivity and ease of performing frequency tuning, and also capable of providing the metal material card having a thin thickness without a separate blocking layer, may be provided.

DESCRIPTION OF DRAWINGS

FIG. 7 is a flowchart illustrating a manufacturing method for a wireless IC card according to an embodiment of the present disclosure.

MODE FOR INVENTION

Figure 1:
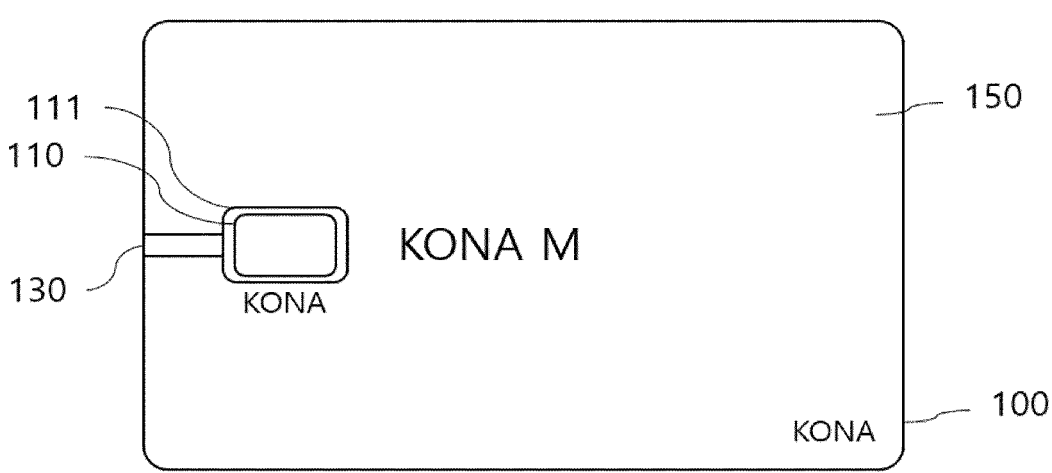
FIG. 1 is a view illustrating a front surface of a wireless IC card according to an embodiment of the present disclosure.

While the present disclosure is susceptible to various modifications and alternative forms, specific embodiments are shown by way of example in the drawings and described in detail.

However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

The terminology used herein is for the purpose of describing specific embodiments only and is not intended to limit the present disclosure. As used herein, the singular forms "a", "an", and "the" are intended to include the plural forms as well, unless the context clearly indicates otherwise. It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

Unless defined otherwise, all terms used herein including technical or scientific terms have the same meanings as generally understood by a person having ordinary knowledge in the art to which the present disclosure pertains. Terms such as those defined in a commonly used dictionary should be interpreted as having a meaning consistent with the meaning of the related technology, and should not be interpreted as an ideal or excessively formal meaning unless explicitly defined in the present specification.

Hereinafter, an exemplary embodiment of the present disclosure will be described in more detail with reference to the accompanying drawings. To facilitate overall understanding of the present disclosure, the same constituent elements in the drawings are denoted by the same reference numerals, and a repeated description of the same elements will be omitted.

Figure 2:
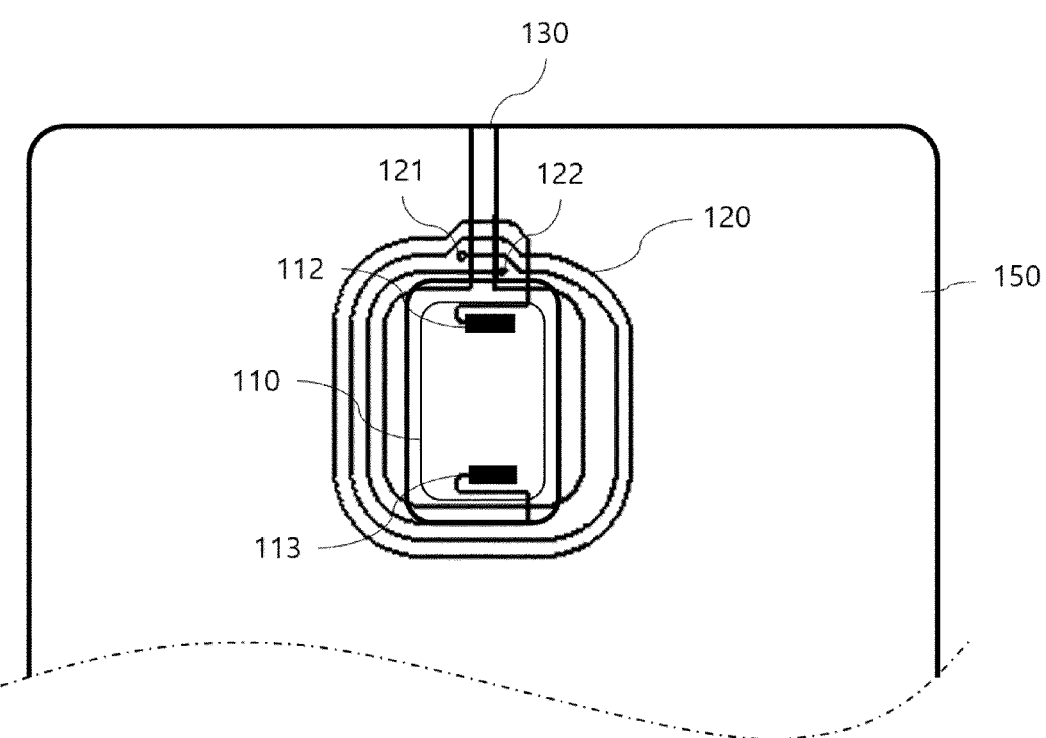
FIG. 2 is a view specifically illustrating a contact coupling relationship between the wireless IC card and an antenna according to an embodiment of the present disclosure.

FIG. 1 is a view illustrating a front surface of a metal card 100 according to an embodiment of the present disclosure, and FIG. 2 is a view more specifically illustrating an antenna connection structure on a rear surface of the metal card 100 according to an embodiment of the present disclosure.

Referring to FIG. 1 and FIG. 2, a credit card in which an IC chip 110 with a wired and wireless dual interface communication that supports a contact manner and a non-contact manner is mounted on a front surface of the credit card may be illustrated as an example of the metal card 100 according to an embodiment of the present disclosure as illustrated in FIG. 1, and characters to identify a card company may be formed by various methods (printing, marking, etching, NC processing, laser processing, and so on).

In addition, according to an embodiment of the present disclosure, a body of the metal card 100 may be manufactured from a metal material of any one of conductors having a conductivity, such as super titanium having excellent elastic restoring force, scandium, SUS, an aluminum-based material, a copper-based material, and so on.

Particularly, a metal body 150 of the metal card 100 according to an embodiment of the present disclosure is a core sheet that expresses a material and a weight that are unique to a metal card, and may be formed of an SUS (Steel Use Stainless) material, a titanium material, an aluminum material, or a copper material.

The metal material of the core sheet of the metal body 150 may be selected in consideration of a material and a weight for expressing characteristics of the metal, and may be also selected in consideration of durability, the degree of abrasion, the degree of deformation, and so on to withstand a processing process. As an embodiment, the core sheet formed of SUS may be a material which is resistant to corrosion and which is capable of being heat treated. The heat treatment refers to an operation process in which metal is heated to a predetermined temperature and improves characteristics or a structure of the metal for a predetermined purpose according to a cooling rate. a concave and convex portion may be formed on a part or all of a surface of the core sheet of the metal body 150 for secure an adhesive force. In addition, when the metal card 100 is manufactured, the core sheet may be processed through a heat treatment process so that a strength and a restoring force are increased.

In addition, in the metal body 150 of the metal card 100 according to an embodiment of the present disclosure, in order to accommodate the IC chip 110, an IC chip accommodating portion 111 which has an opening formed in the metal body 150 and which is provided so as to accommodate the IC chip 110 may be provided. The IC chip accommodating portion 111 may be provided by forming the opening in the metal body 150 through performing a punching processing, an etching processing, or an NC processing for the metal body 150 such that the opening has an area and a depth corresponding to a position and a shape of the IC chip 110.

In addition, in the metal body 150 according to an embodiment of the present disclosure, a slit portion 130 formed by cutting the metal body 150 from a first side of the IC chip accommodating portion 111 toward an outer edge of the metal body 150 may be included.

Here, the slit portion 130 may be a cut region which is capable of increasing antenna characteristics of the metal card 100 according to an embodiment of the present disclosure and which is configured to prevent the metal body 150 from blocking a wireless signal. For example, the slit portion 130 may include a slit structure formed up to the outer edge of the metal body 150 by a preset width corresponding to a width of the IC chip accommodating portion, and the slit structure having various shapes such as a straight line shape, a zigzag shape, a diagonal line shape, a tooth structure shape, and so on may be formed. Here, the preset width may be set to be a width that is smaller than a width of the IC chip accommodating portion, may be set to be a width that is larger than the width of the IC chip accommodating portion, or may be set to be a width same as the width of the IC chip accommodating portion.

Here, due to the structure of the slit portion 130, the metal body 150 has an inductance corresponding to a wireless electromagnetic signal. Therefore, when a first end of an antenna 120 according to an embodiment of the present disclosure is connected to the metal body 150, the metal body 150 may function as a winding coil provided in the antenna 120. Accordingly, the metal body 150 may be utilized as a coil of one antenna 120, so that a tuning process may be shortened while a wireless antenna transmitting and receiving performance of the metal card 100 is increased. Furthermore, since a separate blocking layer is capable of being removed, the metal card 100 having a thinner and more elegant shape is capable of being manufactured. The formation of the antenna 120 and the bonding connection method and the connection structure with the metal body 150 for realizing the characteristics described above will be described in more detail later.

In addition, the slit portion 130 may be filled with an electrically insulating material, or may be maintained in an open state. For example, a reinforcement pin or bonding body formed of a PVC material, a rubber reinforcement material, and so on may be inserted into the slit portion 130, thereby being capable of maintaining the overall shape and durability of the metal card 100.

In addition, as illustrated in FIG. 2, the wireless IC chip 110 may be electrically connected to a lower surface of the metal body 150, and the antenna configured to transmit and receive a wireless signal with an external device such as a card reader may be provided in the lower surface of the metal body 150.

Here, the antenna 120 may include at least one antenna pattern wound around the IC chip accommodating portion 111 such that the antenna 120 is electrically connected to the IC chip and performs a communication function while the antenna 120 is transmitting and receiving a wireless signal with the external device.

In addition, as described above, the antenna 120 is capable of being bonded and connected so that the metal body 150 can forms one turn of the antenna pattern. Therefore, in the antenna 120, a first end of each pattern may be connected to at least one of a first bonding position 121 and a second bonding position 122 of the metal body 150.

More specifically, the antenna 120 may be configured such that a first end of a first pattern is connected to the first bonding position 121 of the metal body positioned adjacent to the slit portion 130 by a preset first distance, and may be configured such that a first end of a second pattern is electrically connected to the second bonding position 122 of the metal body positioned adjacent to the slit portion 130 by a preset second distance, thereby forming the first pattern and the second pattern such that the first pattern and the second pattern extend in a direction continuous with a winding direction of the antenna 1200.

Here, the first bonding position 121 and the second bonding position 122 may be respectively spaced apart by the first distance and the second distance around the slit portion 130, and may be formed at adjacent positions that face each other. The first distance and the second distance may be the same or different from each other.

In addition, the first ends of each pattern may be respectively connected to the first bonding position 121 and the second bonding position 122 of the metal body 150 by an electric bonding method, and an adhesive material having anisotropic conductive characteristics and so on may be used for the connection. For example, electrical bonding connection methods such as an Anisotropic Conductive Film (ACF) method, an Anisotropic Conductive Paste (ACP) method, a conductive adhesive method, a Surface Mount Technology (SMT), and so on may be exemplified.

In addition, conventionally, an anodizing process for insulation may be performed in advance on the metal body 150. However, in order to realize such an electrical bonding connection, a local etching process may be performed in advance on each of the first bonding position 121 and the second bonding position 122.

In addition, a second end of the first pattern that is connected to the first bonding position 121 and a second end of the second pattern that is connected to the second bonding position 122 may be respectively connected to a first contact portion 112 and a second contact portion 113 of the IC chip 110.

However, since the contact portions 112 and 113 in FIG. 2 illustrate a situation in which the antenna 120 and the IC chip 110 are electrically connected to each other in a wired manner, the contact portions 112 and 113 may be omitted when the antenna 120 and the IC chip 110 are electrically connected to each other in a wireless manner.

Since at least the first end of the pattern of the antenna 120 is connected to the metal body 150 in this manner, the metal body 150 may be formed as one winding pattern that extends according to a current direction of the antenna 120.

Accordingly, good antenna characteristic may be realized without having a separate blocking layer on the metal card 100 or performing a complicated manufacturing process.

Figure 3:
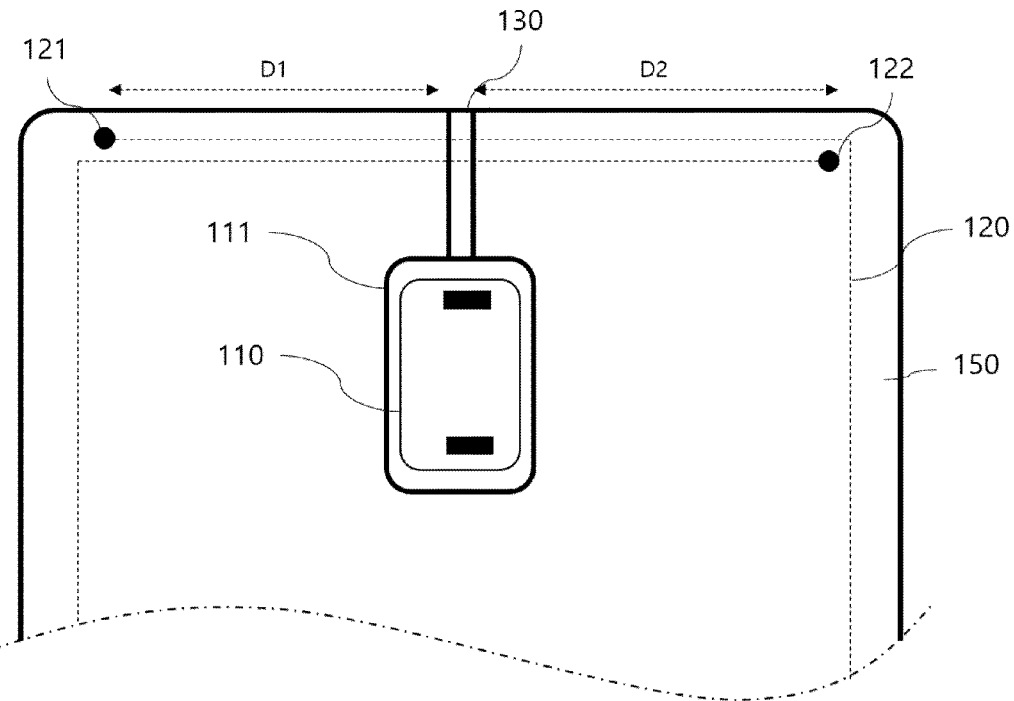
FIG. 3 is a view illustrating a relationship between contact positions according to another embodiment of the present disclosure.

FIG. 3 is a view illustrating a relationship between contact positions according to an embodiment of the present disclosure.

Referring to FIG. 3, the first bonding position 121 and the second bonding position 122 according to an embodiment of the present disclosure may be set such that the first bonding position 121 and the second bonding position 122 face each other around the slit portion 130, and may be respectively formed by being spaced apart from the slit portion 130 by a preset first distance D1 and a preset second distance D2.

Accordingly, the pattern of the antenna 120 may be wound around the IC chip accommodating portion 111 in consideration of the connection positions of the first bonding position 121 and the second bonding position 122, and the winding direction may correspond to the current direction by an electrical connection with the IC chip 110.

Particularly, the first bonding position 121 and the second bonding position 122 may face each other, and may be formed in a diagonal direction position having a predetermined slope. This configuration takes into account the current flow direction. Therefore, the antenna 120 described above is capable of being performed only when a current direction of an antenna coil pattern formed by the antenna 120 and a direction of the current that flows in the metal body 150 provided with the slit portion 130 are formed to be the same.

Therefore, by the position connection in consideration of the antenna characteristics and the current direction as illustrated in FIG. 2, the metal body 150 may function as a part of one antenna that is electrically connected to the IC chip 110.

Figure 4:
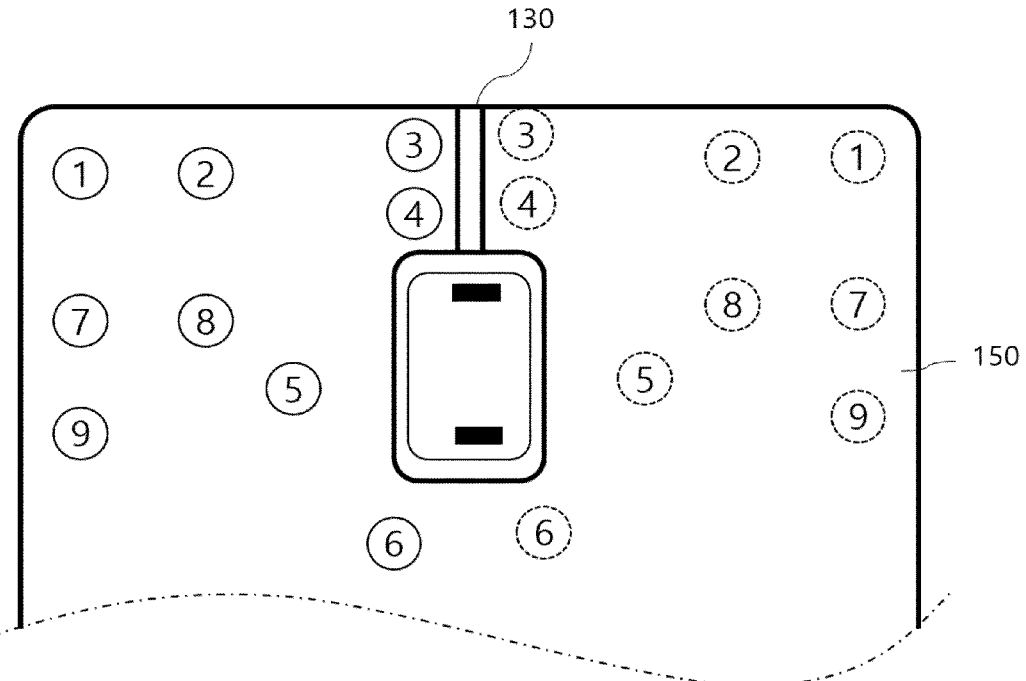
FIG. 4 is a view for illustrating a corresponding relationship and a test result of a contact position according to another embodiment of the present disclosure.

FIG. 4 is a view for illustrating a corresponding relationship and a test result of a contact position according to another embodiment of the present disclosure.

As illustrated in FIG. 4, the second bonding positions 122 of numbers one to nine may be formed corresponding to the first bonding positions 121 of numbers one to nine, respectively.

The bonding positions according to an embodiment of the present disclosure are formed such that the bonding positions face each other. Furthermore, as long as the direction of the current that flows into the metal body 150 is capable being maintained, the positions of the bonding positions are not limited, and the bonding positions are capable of being formed on various positions. Accordingly, FIG. 4 illustrates various embodiments of the first bonding position 121 and the second bonding position 122 that are formed on various positions by being spaced apart from each other.

In addition, as illustrated in Table 1 below, as a result of testing by connecting the antenna 120 to each contact position, it can be confirmed that a generally high recognition distance and appropriate antenna frequency characteristics are realized for each position.

TABLE 1

| Contact position | VSWR | Recognition distance |
| --- | --- | --- |
| 1 | 14.2 MHz / 3.1 | 36.5 mm |
| 2 | 14.3 MHz / 3.0 | 36.0 mm |
| 3 | 14.2 MHz / 3.1 | 36.5 mm |
| 4 | 14.2 MHz / 3.1 | 36.5 mm |
| 5 | 14.2 MHz / 3.3 | 36.0 mm |
| 6 | 13.9 MHz / 3.6 | 36.0 mm |
| 7 | 14.2 MHz / 3.4 | 35 mm |
| 8 | 14.05 MHz / 3.5 | 35 mm |
| 9 | 13.90 MHz / 3.6 | 34 mm |

On the other hand, as described above, when the current direction of the antenna coil is inversely connected from position 3, the VSWR is 26.8 MHz/2.1, so that the result of wireless recognition failure can be confirmed. Such a result may be understood as describing that the metal body 150 can function smoothly as a coil rather than as a simple metal body. Furthermore, by performing a frequency tuning process for the antenna 120 integrally coupled to the metal body 150, the metal card 100 is capable of being easily and rapidly manufactured.

Figure 5:
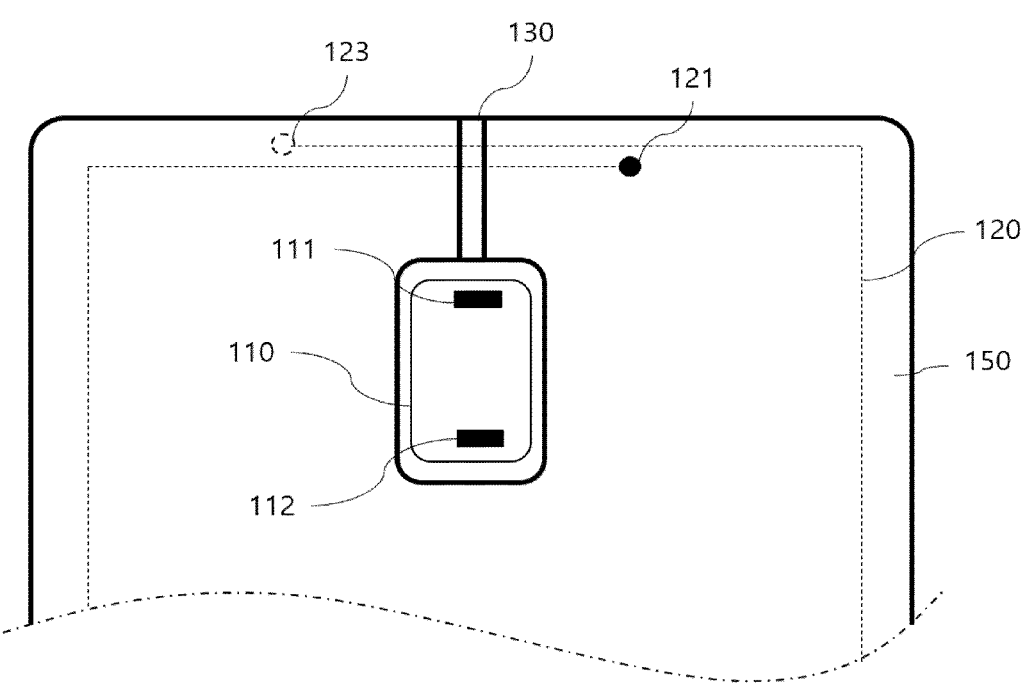
FIG. 5 is a view illustrating a situation in which a single contact position according to an embodiment of the present disclosure is formed.

FIG. 5 is a view illustrating a situation in which a single contact position according to an embodiment of the present disclosure is formed.

Referring to FIG. 5, the contact between the metal body 150 and the antenna 120 according to an embodiment of the present disclosure may be formed by bonding only one point of the first bonding position 121, and another first end of the antenna 120 may be formed in an open structure.

In this case, coupling may be formed in an open area between the metal body 150 and the antenna 120, and antenna characteristics and tuning may be more easily performed by adjusting the coupling. In order to definitively form the open structure that is not electrically connected to a coupling region, a third bonding position 123 according to an embodiment of the present disclosure may further be formed, and a bonding material may be formed of an insulating material such as PVC, a plastic adhesive, and so on.

Figure 6:
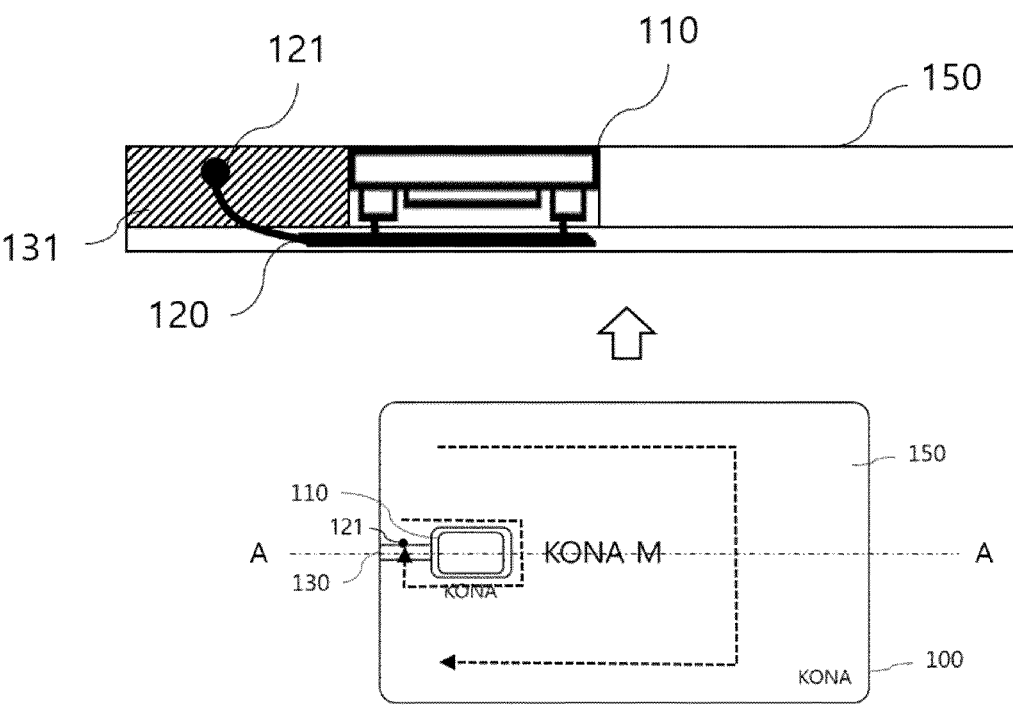
FIG. 6 is a view illustrating a situation in which a slit side surface portion contact position according to an embodiment of the present disclosure is formed.

FIG. 6 is a view illustrating a situation in which a slit side surface portion contact position according to an embodiment of the present disclosure is formed.

Referring to FIG. 6, as the slit portion 130 according to an embodiment of the present disclosure is formed by cutting the metal body 150, a side surface portion 131 may be further provided. Furthermore, the first bonding position 121 according to an embodiment of the present disclosure is capable of being provided on the side surface portion 131.

Accordingly, as illustrated in FIG. 6, at least a portion of the antenna 120 positioned at an antenna layer at a lower portion of the metal body 150 may be bonded and connected to the side surface portion 131 of the slit portion 130. A position and a direction of the first bonding position 121 connected by bonding may be formed in a direction that extends the current direction of the winding pattern of the antenna 120, and the metal body 150 may be configured such that the metal body 150 functions as one coil.

FIG. 7 is a flowchart illustrating a manufacturing method for a wireless IC card according to an embodiment of the present disclosure.

Referring to FIG. 7, first, an anodizing process for insulation and an etching process corresponding to the first bonding position 121 is performed on the metal body S101.

In addition, a milling process is performed on the metal body 150 according to a position and a depth for accommodating the IC chip 110, thereby forming the IC chip accommodating portion 111 having the opening S102.

Next, the slit portion 130 formed in the metal body 150 by cutting the metal body 150 from the first side of the IC chip accommodating portion 111 toward the outer edge of the metal body 150 is processed S103.

Next, at least a first end portion of the antenna 120 electrically connected to the wireless IC chip 110 is bonded to the first bonding position 121 that is pre-etched on a lower surface of the metal body 150, and the metal body 150 provided with the slit portion 130 is configured such that the metal body 150 extends the turns of the antenna pattern.

In addition, frequency tuning is performed in consideration of antenna characteristics for the metal card 100 S107.

As described above, an optimal embodiment has been disclosed in the drawings and the present specification. Although particular terms are used herein, they are merely intended to describe the present disclosure without limiting the meaning and the scope of the present disclosure described in the claims. Therefore, it will be understood by a person skilled in the art to which the present disclosure pertains that various modifications and equivalent other embodiments are possible. Accordingly, the scope of the present disclosure should be defined by the technical spirit of the appended claims.

DESCRIPTION OF REFERENCE NUMERALS

100: metal Card 110: IC chip
111: IC chip accommodating portion 130: slit portion
150: metal body 120: antenna
121: first contact position 122: second contact position

The invention claimed is:

1. A wireless IC card in which a wireless IC chip is mounted and which comprises a metal body, the wireless IC card comprising:

an IC chip accommodating portion formed by forming an opening in the metal body and being provided so as to accommodate the wireless IC chip;

a slit portion formed by cutting the metal body from a first side of the IC chip accommodating portion toward an outer edge of the metal body; and an antenna disposed on a lower surface of the metal body and electrically connected to the wireless IC chip, wherein the antenna has at least one antenna pattern comprising a first pattern and a second pattern, and a first end of the first pattern is electrically connected to a first bonding position of the metal body, and a first end of the second pattern is electrically connected to a second bonding position of the metal body, and the slit portion is between the first bonding position and the second bonding position of the metal body.

2. The wireless IC card of claim 1, wherein a second end of the first pattern is connected to a first contact of the wireless IC chip, and a second end of the second pattern is connected to a second contact of the wireless IC chip.

3. The wireless IC card of claim 1, wherein the slit portion is formed up to the outer edge of the metal body by a preset width corresponding to a width of the IC chip accommodating portion.

4. The wireless IC card of claim 1, wherein the first end of the first pattern is electrically connected to the metal body by using an adhesive material having anisotropic conductive characteristics or conductive characteristics or by using an electrical adhesive connection method corresponding to the adhesive material.

5. The wireless IC card of claim 1, wherein, after an anodizing process is performed on the metal body, the first bonding position is pre-etched such that the first end of the first pattern is electrically connected to the first bonding position.

6. A manufacturing method for a wireless IC card in which a wireless IC chip is mounted and which comprises a metal body, the manufacturing method comprising:

a process of forming an IC chip accommodating portion provided so as to accommodate the wireless IC chip by forming an opening in the metal body;

a process of processing a slit portion that is formed by cutting the meal body from a first side of the IC chip accommodating portion toward an outer edge of the metal body; and a process of connecting an antenna that is electrically connected to the wireless IC chip to a lower surface of the metal body, wherein the antenna has at least one antenna pattern comprising a first pattern and a second pattern, and a first end of the first pattern is electrically connected to a first bonding position of the metal body, and a first end of the second pattern is electrically connected to a second bonding position of the metal body, and the slit portion is between the first bonding position and the second bonding position of the metal body.

7. The manufacturing method of claim 6, wherein a second end of the first pattern is connected to a first contact of the wireless IC chip, and a second end of the second pattern is connected to a second contact of the wireless IC chip.

8. The manufacturing method of claim 6, wherein the process of processing the slit portion comprises a process of forming the slit portion by cutting the metal body up to the outer edge of the metal body by a preset width corresponding to a width of the IC chip accommodating portion.

9. The manufacturing method of claim 6, wherein the process of connecting the antenna comprises a process of electrically connecting the first end of the first pattern to the metal body by using a metal body by using an adhesive material having anisotropic conductive characteristics or conductive characteristics or by using an electrical adhesive connection method corresponding to the adhesive material.

10. The manufacturing method of claim 6, further comprising:

a process of performing an anodizing process on the metal body; and a process of performing a pre-etching process such that the first bonding position of the metal body that is anodized is electrically connected to the first end of the first pattern.

* * * * *